Figure 1:
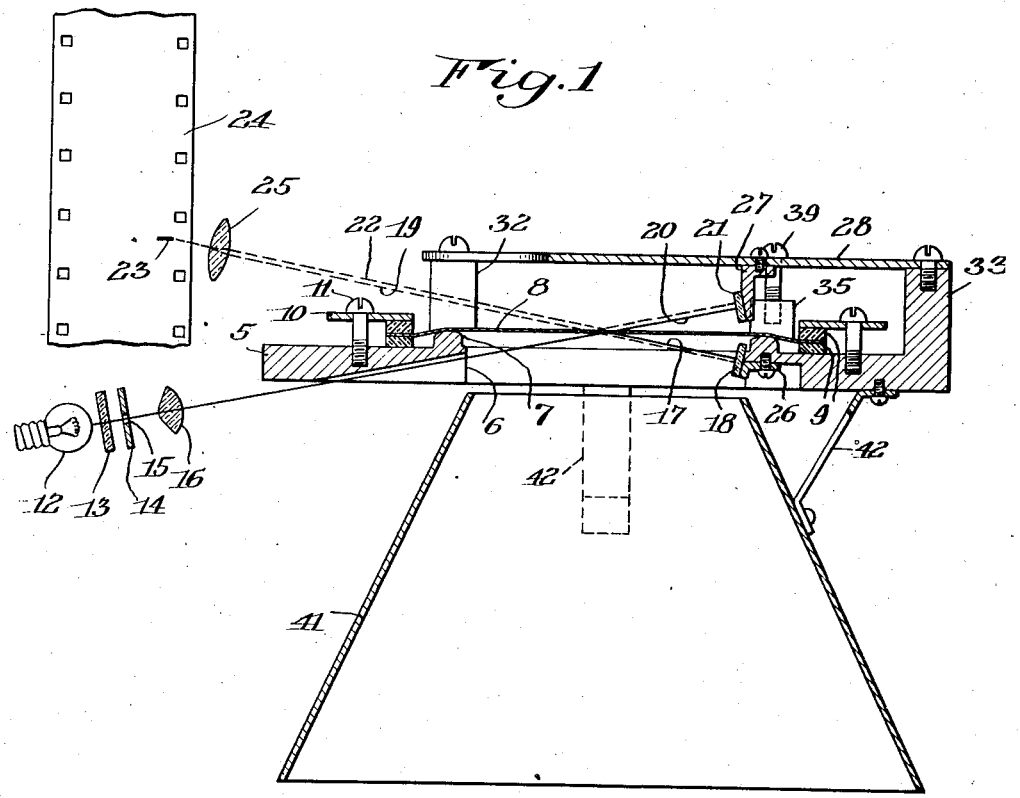

June 13, 1933. R. V. WOOD 1,913,867
METHOD AND APPARATUS FOR CONTROLLING PROJECTION
OF LIGHT BY SOUND WAVES
Filed Jan. 29, 1932

INVENTOR
Remsen V. Wood
BY Edward H. Crumpton
his ATTORNEY

Patented June 13, 1933

1,913,867

UNITED STATES PATENT OFFICE

REMSEN V. WOOD, OF ROCHESTER, NEW YORK

METHOD AND APPARATUS FOR CONTROLLING PROJECTION OF LIGHT BY SOUND WAVES

Application filed January 29, 1932. Serial No. 589,690.

This invention relates to methods and apparatus for controlling the projection of light by means of sound waves, one object of the invention being to provide a method and apparatus for this purpose of a more simple, reliable and effective nature.

Another object is to provide a method and apparatus for accomplishing the above result by means of interfering light wave effects.

A further object is the provision of a more simple and unitary method and apparatus for recording sound by using the sound waves to control the projection of light on a sensitive material, such, for example, as a motion picture or other photographic film.

A still further object is to provide a sound recording method and apparatus utilizing the effect of interfering light waves produced by the sound to be recorded.

To these and other ends the invention resides in certain improvements and combinations of parts, all as will be hereinafter more fully described, the novel features being pointed out in the claims at the end of the specification.

Figure 2:
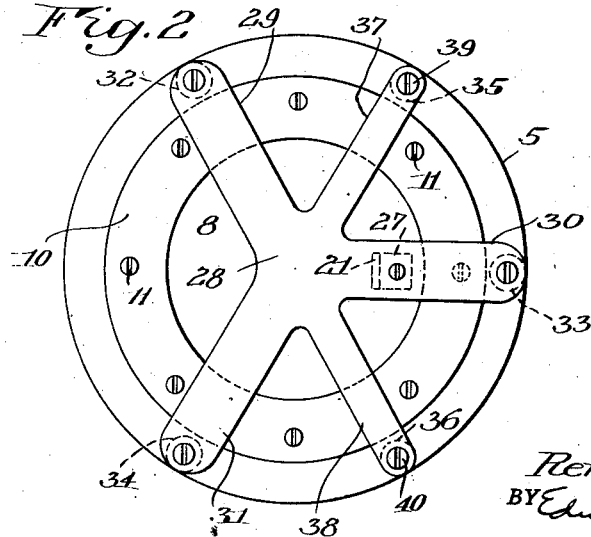

In the drawing:

Fig. 1 is a general view, partly diagrammatic and partly in section, showing an apparatus for carrying out the method of the present invention and embodying the same, and Fig. 2 is a view of a portion of the apparatus taken at right angles to Fig. 1 and more particularly showing a means for mounting and adjusting a light reflecting means employed in the invention.

The same reference numerals throughout the several views indicate the same parts.

The invention is disclosed herein, by way of illustration, as applied to the use of recording sound on a motion picture film, but it will be understood, of course, that its principles may be adapted and applied to other uses.

One aspect of the invention provides a method for controlling the projection of light by means of sound waves. For this purpose a very thin, flexible, transparent diaphragm is formed of suitable material, such, for example, as cellulose nitrate or other cellulosic material capable of being prepared, in known ways, to produce such a diaphragm. This diaphragm is then stretched over a support or frame so that it may be set into vibration by sound wave impulses.

A beam of light from a suitable common source is projected at an acute angle against the diaphragm with the result that a portion of the beam is reflected, while another portion is refracted or transmitted through the diaphragm and projected at its opposite side. The angle of incidence of the original beam is preferably such that the said reflected and refracted portions are substantially equal in intensity. The portion reflected from the diaphragm is again reflected back toward the point of incidence by any suitable means, such as a mirror, so that a part at least of this reflected portion of the beam is then refracted and transmitted through the diaphragm and projected at its opposite side. The other portion of the original beam which is refracted through the diaphragm is likewise reflected back toward the point of refraction by any suitable means, such as a mirror, with the result that a part at least of this beam is then reflected from the opposite side of the diaphragm and projected at such opposite side. The two reflecting means or mirrors located on opposite sides of the diaphragm are so adjusted that the two beam portions projected as stated on the side of the diaphragm opposite the light source are directed to a common point to there form superposed images of the light source.

The light source is preferably provided with a partition or plate formed with a narrow slit aperture, as well understood in the art, and with any suitable collimating lens means, and also with a color filter if so desired. Objective lens means are also provided in the path of the rays reflected and superposed as described at the opposite side of the film, for the purpose of collecting or condensing the same to form, on a motion picture film or other receiving surface, superposed images of the aperture slit.

It is apparent that by directing sound waves against the thin film or diaphragm, it may be set into vibratory motion and that the vibrations will differentially vary the lengths of the beams reflected from its opposite sides and thence superposed by the mirrors. Such vibrations of the diaphragm thus produce differences between the lengths of these reflected beams of less than a wave length, with the result that the known light wave interference effects will be caused between the superposed beams or images, such as produced, for example, by the known Michelson interferometer apparatus. As the varying intensity and volume of sound proportionately varies the vibration of the thin, light reflecting diaphragm, the interference effects are proportionately varied with the result that the composite image formed on the receiving surface is proportionately varied in intensity and this affords means for faithfully recording the sound on a motion picture or other sensitive surface from which it can be reproduced by known or suitable sound reproducing devices, as well understood in the art.

One form of apparatus suitable for carrying out the above method is illustrated in the drawing, partly in a diagrammatic manner for the purpose of avoiding unnecessary detail. This apparatus preferably comprises a base plate 5 having therein a circular central opening 6 about which, on one side of the plate, is a circular shoulder or bridge 7 over which the said thin, flexible transparent diaphragm 8 is stretched. The peripheral edges of the diaphragm are preferably cemented between rubber rings 9, for securely holding and mounting the diaphragm with the least danger of injury. These rings 9 are held on the base plate 5 by means of an annular plate 10 through which screws 11 are passed into the plate 5 and by means of which the plate 10 is drawn down in clamping engagement with the peripheral mounting means of the diaphragm. As the edges of the diaphragm are thus located at a height slightly less than that of the bridge 7, the result is to stretch the diaphragm taut over the bridge 7 and across the opening 6.

A suitable light source is indicated conventionally at 12 and may be provided with a color filter 13 of any known or suitable variety. The light source is also provided with a partition or plate 14 having formed therein a slit aperture 15 of narrow width, say 0.003 inches. The beam of light projected from the source through this slit aperture passes through suitable collimating lens means indicated diagrammatically at 16 from which parallel rays are projected through the opening 6 of plate 5 and against the center of the diaphragm 8. It is evident that portions of this incident beam will be respectively reflected from the surface or surfaces of the diaphragm and also refracted or transmitted through the same to its opposite side. It is preferred, as stated above, to select such an angle of incidence of the beam from the light source on the film that these reflected and refracted portions of the beam will have about the same intensity.

A portion of the beam reflected from the diaphragm is indicated at 17 and a suitable means or reflector, such as the mirror 18, is provided for reflecting this beam portion back toward the point of incidence so that a part at least of the beam 17 is refracted and transmitted through the diaphragm and projected at its opposite side as indicated at 19.

The portion of the beam from the light source which is refracted or transmitted through the diaphragm is indicated at 20 and a suitable means or reflector, such as the mirror 21, is provided and positioned to reflect this beam portion back toward the point of refraction by the diaphragm so that a portion at least is reflected by the diaphragm as indicated at 22 at the opposite side of the film.

The reflectors or mirrors 18 and 21 are so disposed as to cause the beams 19 and 22 to form superposed slit images at a common point 23 on a sensitive material such, for example, as the motion picture film 24, suitable objective lens means, as indicated at 25, being provided for this prpose as well understood in the art.

Suitable means are provided for effecting relative adjustment between the reflecting mirrors 18 and 21 in order to superpose the reflected images. Such adjusting means may obviously have different forms and in the present instance the mirror 18 has fixed thereto a clip 26 secured by means of a screw to the plate 5 in the desired position. Mirror 21 is fixed on a clip 27 secured by means of a screw to a plate frame or spider 28 having three main arms 29, 30 and 31 fixed by means of screws to supporting posts 32, 33 and 34 rising to an equal height from the plate 5. The latter is provided also with spaced posts 35 and 36 on opposite sides of the spider and terminating at some distance below it. Spider arms 37 and 38 extend over these shorter posts and carry screws 39 and 40, turning freely in the spider arms but threadedly engaged in openings in the tops of the corresponding posts, so that by turning either or both of these screws the spider plate may be warped to effect the desired positioning of mirror 21 to cause the slit image reflected thereby to coincide with the image projected by the other mirror 18 at the common point 23.

Suitable means are provided for collecting and directing sound waves against the vibratory diaphragm 8, as indicated in the present instance by the cone or mouth piece 41 supported on plate 5 by means of brackets 42.

It is evident from the above description that the sound waves impinging upon the very thin and sensitive diaphragm 8, set up in the latter responsive and proportional vibrations which in turn produce a differential variation between the lengths of the beams 17 and 20 and the reflections thereof from the mirrors 18 and 21, with the result that known interference effects are produced and made apparent in the intensity of the composite image produced at 23, so that the intensity of this composite image varies in proportion to the intensity and volume of the sound directed against the diaphragm.

The above method and apparatus thus combine in a simple compact and unitary way several operations or functions heretofore commonly requiring several different units such, for example, as the microphone, amplifier and light valve employed in known apparatus for recording sound on a film. In view of the comparatively simple and direct manner in which such operations are accomplished, the present method and apparatus afford advantageous simplicity of control and reliability and accuracy in results, together with simplicity and economy in the apparatus required.

I claim:

1. An apparatus for controlling light by sound comprising a light source, a transparent diaphragm arranged to vibrate in response to sound waves, and means whereby the light from said source is transmitted through and reflected from opposite sides of said diaphragm and superposed, so that the vibration of said diaphragm tends to produce interfering light effects.

2. An apparatus for controlling light by sound comprising a light source, spaced reflectors, and a transparent diaphragm between said reflectors for reflecting and transmitting light from said source to and from said reflectors and to a common point, said diaphragm being arranged to vibrate in response to sound waves and to produce an interference effect apparent at said common point.

3. An apparatus for controlling light by sound comprising a light source provided with a partition having an aperture and collimating lens means, spaced reflectors, and a flexible transparent diaphragm between said reflectors for reflecting and transmitting light from said aperture to and from said reflectors and forming superposed images of said aperture, said diaphragm being arranged to vibrate in response to sound waves and produce interference effects in said images.

4. A sound recording apparatus comprising a light source, spaced reflectors, a transparent diaphragm between said reflectors for reflecting and transmitting light from said source to and from said reflectors and to a common point, said diaphragm being arranged to vibrate in response to sound waves, and a light sensitive material on which said reflected light is projected at said common point for producing a record on said material by interference effects.

5. A sound recording apparatus comprising a light source provided with a partition having a slit with a collimating lens means, spaced reflectors, a flexible transparent diaphragm between said reflectors for reflecting and transmitting light from said slit to and from said reflectors and forming superposed slit images, and a sensitive material on which said slit images are projected for forming a record by interfering light wave effects.

6. A method of recording sound comprising projecting light from a common source against one side of a thin flexible transparent film to cause said light to be reflected by the surface of said film and also refracted through its opposite side, reflecting said reflected and refracted light back against the opposite sides of said film so that the light rays reflected from opposite sides of said film are superposed at a common point, locating a sensitive material to receive said light rays at said common point and vibrating said film by sound waves to produce a record thereof on said material by interfering light wave effects.

7. A method of recording sound comprising projecting light from a common source against one side of a thin flexible transparent film to cause said light to be reflected by the surface of said film and also refracted through its opposite side, reflecting said reflected and refracted light back against the opposite sides of said film to refract and reflect the light rays and superpose them at a common point, locating a recording means to receive said light rays at said common point, and vibrating said film by sound waves to produce a record therof on said means by interfering light wave effects.

REMSEN V. WOOD.